United States Patent
Kishiro et al.

(10) Patent No.: US 12,044,314 B2
(45) Date of Patent: Jul. 23, 2024

(54) SEALING DEVICE

(71) Applicant: NOK CORPORATION, Tokyo (JP)

(72) Inventors: Masamichi Kishiro, Fukushima (JP);
Nobuhiro Nishimura, Fukushima (JP);
Naoki Meguro, Fukushima (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 17/764,605

(22) PCT Filed: Jul. 2, 2020

(86) PCT No.: PCT/JP2020/026027
§ 371 (c)(1),
(2) Date: Mar. 29, 2022

(87) PCT Pub. No.: WO2021/065129
PCT Pub. Date: Apr. 8, 2021

(65) Prior Publication Data
US 2022/0341493 A1    Oct. 27, 2022

(30) Foreign Application Priority Data

Sep. 30, 2019  (JP) ................................ 2019-178229
Apr. 20, 2020  (JP) ................................ 2020-074781

(51) Int. Cl.
*F16J 15/3276*    (2016.01)
(52) U.S. Cl.
CPC ................................ *F16J 15/3276* (2013.01)
(58) Field of Classification Search
CPC .. F16J 15/3232; F16J 15/3252; F16J 15/3268; F16J 15/3276
See application file for complete search history.

(56) References Cited

U.S. PATENT DOCUMENTS 2,873,153 A * 2/1959 Haynie ............... F16C 33/7876
                                                       277/575
8,042,422 B2 * 10/2011 Meyer ................. F16J 15/3276
                                                       74/421 A
(Continued)

FOREIGN PATENT DOCUMENTS

EP    2053288 A2    4/2009
JP    51-67961 U1   5/1976
(Continued)

OTHER PUBLICATIONS

International Search Report issued in International Patent Application No. PCT/JP2020/026027, dated Sep. 24, 2020, along with an English translation thereof.
(Continued)

*Primary Examiner* — Nicholas L Foster
(74) *Attorney, Agent, or Firm* — Greenblum & Bernstein, P.L.C.

(57) ABSTRACT

An elastic body includes an annular main body portion to be disposed in an annular gap, a seal lip portion extending from a portion, closer to an object to be sealed, of the main body portion and being to be in contact with an inner member, a flange portion extending outwardly from an end, opposite to the object to be sealed, of the main body portion and including a first side closer to the object to be sealed, the first side being to be in contact with an outer member, a side lip portion extending from the end opposite to the object to be sealed in a direction away from the object to be sealed, and a projecting portion formed circumferentially on a second side, opposite to the object to be sealed, of the flange portion. The side lip portion has a back surface configured to be in contact with the projecting portion in response to the side lip portion being pressed by a mating member disposed opposite to the object to be sealed.

19 Claims, 11 Drawing Sheets

(56) References Cited

U.S. PATENT DOCUMENTS

| | | | | |
|---|---|---|---|---|
| 8,790,017 | B2* | 7/2014 | Ohtsuki | B60B 27/00 |
| | | | | 384/489 |
| 10,208,861 | B2* | 2/2019 | Hamamoto | F16J 15/3232 |
| 10,293,531 | B2* | 5/2019 | Kato | B29C 45/1418 |
| 10,794,491 | B2* | 10/2020 | Jimenez | F16J 15/3276 |
| 11,092,239 | B2* | 8/2021 | Happ | F16J 15/3276 |
| 11,536,372 | B2* | 12/2022 | Meguro | F16J 15/3252 |
| 2002/0130472 | A1* | 9/2002 | Endo | F02F 11/002 |
| | | | | 277/591 |
| 2006/0170165 | A1* | 8/2006 | Meyer | F16H 57/029 |
| | | | | 277/353 |
| 2011/0006485 | A1* | 1/2011 | Nakagawa | F16J 15/3264 |
| | | | | 277/549 |
| 2013/0044972 | A1* | 2/2013 | Ohtsuki | B60B 35/025 |
| | | | | 384/489 |
| 2016/0250788 | A1* | 9/2016 | Kato | F16J 15/3276 |
| | | | | 264/266 |
| 2017/0122438 | A1* | 5/2017 | Hamamoto | F16J 15/3252 |
| 2018/0209546 | A1* | 7/2018 | Nagahamaya | F16C 33/7823 |
| 2020/0063868 | A1* | 2/2020 | Happ | F16J 15/3232 |
| 2020/0124179 | A1* | 4/2020 | Jimenez | F16J 15/3256 |
| 2021/0172525 | A1* | 6/2021 | Meguro | F16J 15/3276 |
| 2021/0341058 | A1* | 11/2021 | Maffezzoli | F16J 15/022 |

FOREIGN PATENT DOCUMENTS

| | | |
|---|---|---|
| JP | S60-133271 U | 9/1985 |
| JP | 9-133068 A | 5/1997 |
| JP | 2009-103177 A | 5/2009 |
| JP | 2014-101897 A | 6/2014 |
| JP | 2017-89801 A | 5/2017 |
| JP | 2017-198253 A | 11/2017 |

OTHER PUBLICATIONS

Written Opinion issued in International Patent Application No. PCT/JP2020/026027, dated Sep. 24, 2020, along with an English translation thereof.

Japanese Official Action in counterpart Japanese Application No. 2021-550341, dated Sep. 26, 2023, and English translation.

\* cited by examiner

SEALING DEVICE

TECHNICAL FIELD

The present invention relates to a sealing device.

BACKGROUND ART

Patent Literature 1 discloses a sealing device which is configured to seal an annular gap between a plug tube of an ignition system installed in an engine head of an engine and a head cover of the engine. This sealing device is formed from a plug tube sealing member for sealing an oil, and a waterproof sealing member having a U-shaped cross-section. There has been a demand for reducing the number of components by integrating the above-mentioned components together.

CITATION LIST

Patent Literature

Patent Literature 1: Japanese Patent Application Publication No. Hei 9-133068

SUMMARY OF INVENTION

Technical Problem

A possible option for the integration of the sealing device is to provide a new lip portion. However, a positional variation of a counterpart component (such as an upper part of a coil body of an ignition system) is large. Accordingly, a desired surface pressure may be obtained if a squeeze of the new lip portion is small. On the other hand, if the squeeze is large, there is a risk of an increase in contact area (surface contact) that may lead to a failure to obtain the desired surface pressure.

In view of the above, it is an object of the present invention to provide a sealing device, which is capable of reducing the number of components and ensuring a sealing performance by obtaining a desired surface pressure not only in a case where a squeeze of a side lip portion is small but also in a case where the squeeze is large.

Solution to Problem

A sealing device according to one aspect of the present invention includes an elastic body that seals an annular gap between an inner member and an outer member. The elastic body includes an annular main body portion to be disposed in the annular gap, a seal lip portion extending from a portion, closer to an object to be sealed, of the main body portion and being to be in contact with the inner member, a flange portion extending outwardly from an end, opposite to the object to be sealed, of the main body portion and including a first side closer to the object to be sealed, the first side being to be in contact with the outer member, a side lip portion extending from the end opposite to the object to be sealed in a direction away from the object to be sealed, and a projecting portion formed circumferentially on a second side, opposite to the object to be sealed, of the flange portion. The side lip portion has a back surface that is in contact with the projecting portion in response to the side lip portion being pressed by a mating member disposed opposite to the object to be sealed.

A sealing device according to another aspect of the present invention includes an elastic body that seals an annular gap between an inner member and an outer member. The elastic body includes an annular main body portion to be disposed in the annular gap, a seal lip portion extending from a portion, closer to an object to be sealed, of the main body portion and being to be in contact with the inner member, a flange portion extending outwardly from an end, opposite to the object to be sealed, of the main body portion and including a first side closer to the object to be sealed, the first side being to be in contact with the outer member, a side lip portion extending from the end opposite to the object to be sealed in a direction away from the object to be sealed, and a projecting portion formed circumferentially on a back surface of the side lip portion. The projecting portion is in contact with the flange portion in response to the side lip portion being pressed by a mating member disposed opposite to the object to be sealed.

A sealing device according to another aspect of the present invention includes an elastic body that seals an annular gap between an inner member and an outer member. The elastic body includes an annular main body portion to be disposed in the annular gap, a seal lip portion extending from a portion, closer to an object to be sealed, of the main body portion and being to be in contact with the inner member, a flange portion extending outwardly from an end, opposite to the object to be sealed, of the main body portion and including a first side closer to the object to be sealed, the first side being to be in contact with the outer member, a side lip portion extending from the end opposite to the object to be sealed in a direction away from the object to be sealed, and projecting portions each formed circumferentially on a front surface of the side lip portion and respectively positioned at a plurality of locations in an extension direction of the side lip portion. The projecting portions are in contact with a mating member disposed opposite to the object to be sealed with respective to the projecting portions and a back surface of the side lip portion is in contact with a second side, opposite to the object to be sealed, of the flange portion in response to the side lip portion being pressed by the mating member.

A sealing device according to another aspect of the present invention includes an elastic body that seals an annular gap between an inner member and an outer member. The elastic body includes an annular main body portion to be disposed in the annular gap, a seal lip portion extending from a portion, closer to an object to be sealed, of the main body portion and being to be in contact with the inner member, a flange portion extending outwardly from an end, opposite to the object to be sealed, of the main body portion and including a first side closer to the object to be sealed, the first side being to be in contact with the outer member, a side lip portion extending from the end opposite to the object to be sealed in a direction away from the object to be sealed, and a bent portion bent circumferentially and having a convex side of a back surface of the side lip portion. The bent portion is in contact with the flange portion in response to the side lip portion being pressed by a mating member disposed opposite to the object to be sealed.

According to the present invention, provision of the elastic body with the seal lip portion and the side lip portion makes it possible to achieve both a function to seal a sealing target fluid such as an oil and a waterproof function while reducing the number of components at the same time. Meanwhile, even in a case where a gap between the mating member and the sealing portion is small due to a positional variation of the mating member when the sealing device is fitted, the side lip portion comes into contact with the projecting portion provided to the flange portion, so that a desired surface pressure can be obtained and a sealing performance can be ensured. On the other hand, in a case where the gap between the mating member and the sealing portion is large, the side lip portion comes into contact with the mating member, so that the desired surface can be obtained and the sealing performance be ensured.

Alternatively, also in the configuration where the projecting portion is provided to the side lip portion, in a case where the gap between the mating member and the sealing portion is small due to a positional variation of the mating member, the projecting portion of the side lip portion comes into contact with the flange portion. Therefore, a desired surface pressure can be obtained and a sealing performance can be ensured. On the other hand, in a case where the gap between the mating member and the sealing portion is large, the side lip portion comes into contact with the counterpart member, so that the desired surface can be obtained and the sealing performance be ensured.

Alternatively, also in the configuration where a plurality of projecting portions are provided to the front surface of the side lip portion, in a case where the gap between the mating member and the sealing portion is small due to a positional variation of the mating member, the plurality of projecting portions of the side lip portion come into contact with the mating member. Therefore, a desired surface pressure can be obtained and a sealing performance can be ensured. On the other hand, in a case where the gap between the mating member and the sealing portion is large, the side lip portion comes into contact with the mating member, so that the desired surface can be obtained and the sealing performance be ensured.

Alternatively, also in the configuration where the bent portion bent circumferentially and having a convex side of a back surface of the side lip portion, in a case where the gap between the mating member and the sealing portion is small due to a positional variation of the mating member, the convex shape of the bent portion comes into contact with the mating member. Therefore, a desired surface pressure can be obtained and a sealing performance can be ensured. On the other hand, in a case where the gap between the mating member and the sealing portion is large, the side lip portion comes into contact with the mating member, so that the desired surface can be obtained and the sealing performance be ensured.

Advantageous Effects of Invention

According to the sealing device of the present invention, it is possible to reduce the number of components, and to ensure a sealing performance by obtaining a desired surface pressure not only in a case where a squeeze of the side lip portion is small but also in a case where the squeeze is large.

DESCRIPTION OF EMBODIMENTS

Figure 1:
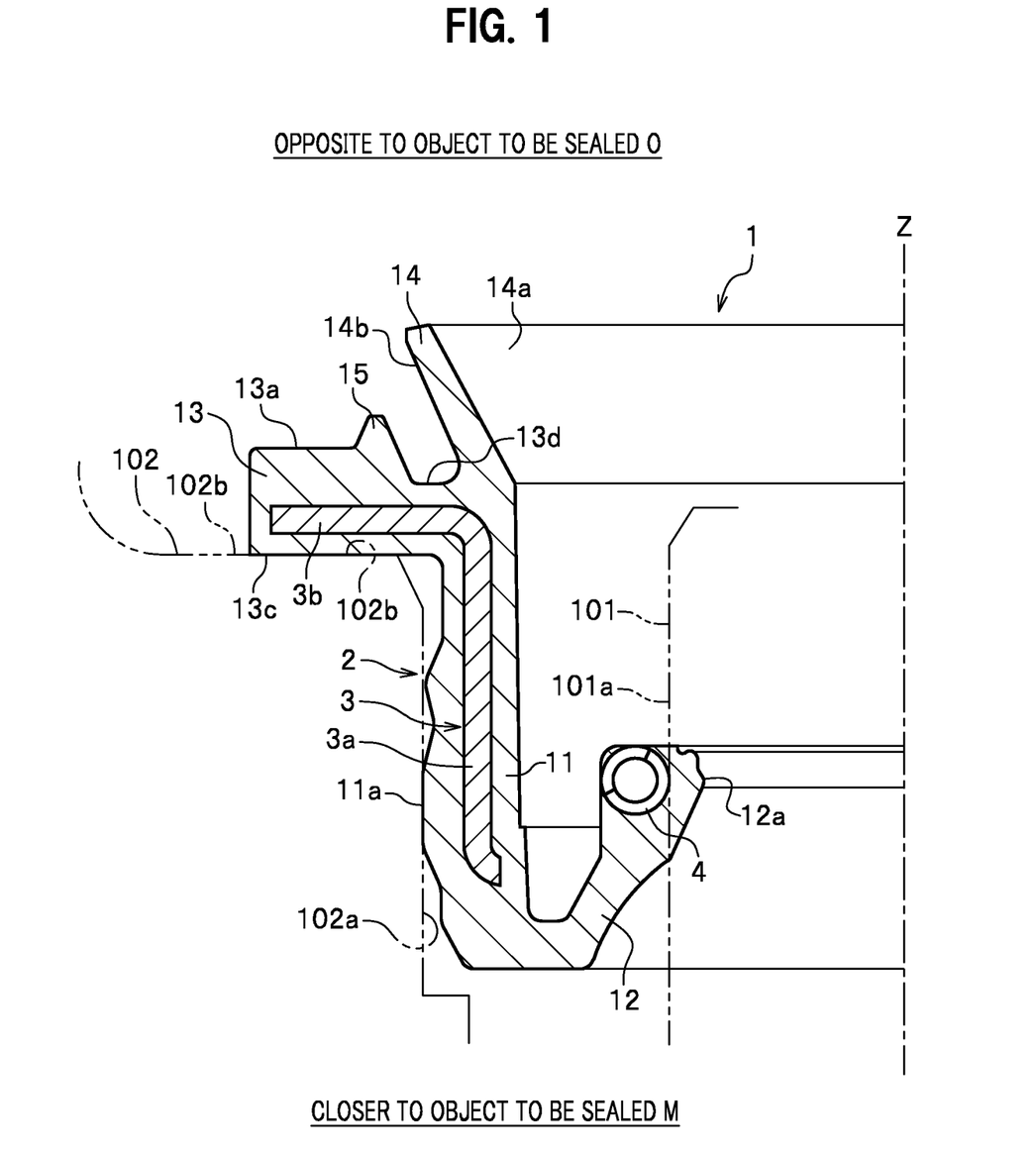
FIG. 1 is a partial cross-sectional view showing a sealing device according to Embodiment 1 in a state before fitting, which is taken along a plane passing through an axial center.

In the following description, a "front surface" means a surface opposite to a "back surface". As shown in FIG. 1, a sealing device 1 according to an embodiment includes an elastic body module 2 that seals an annular gap between an inner member 101 and an outer member 102. The elastic body module 2 includes a main body portion 11, a seal lip portion 12, a flange portion 13, a side lip portion 14, and a projecting portion 15.

Figure 2:
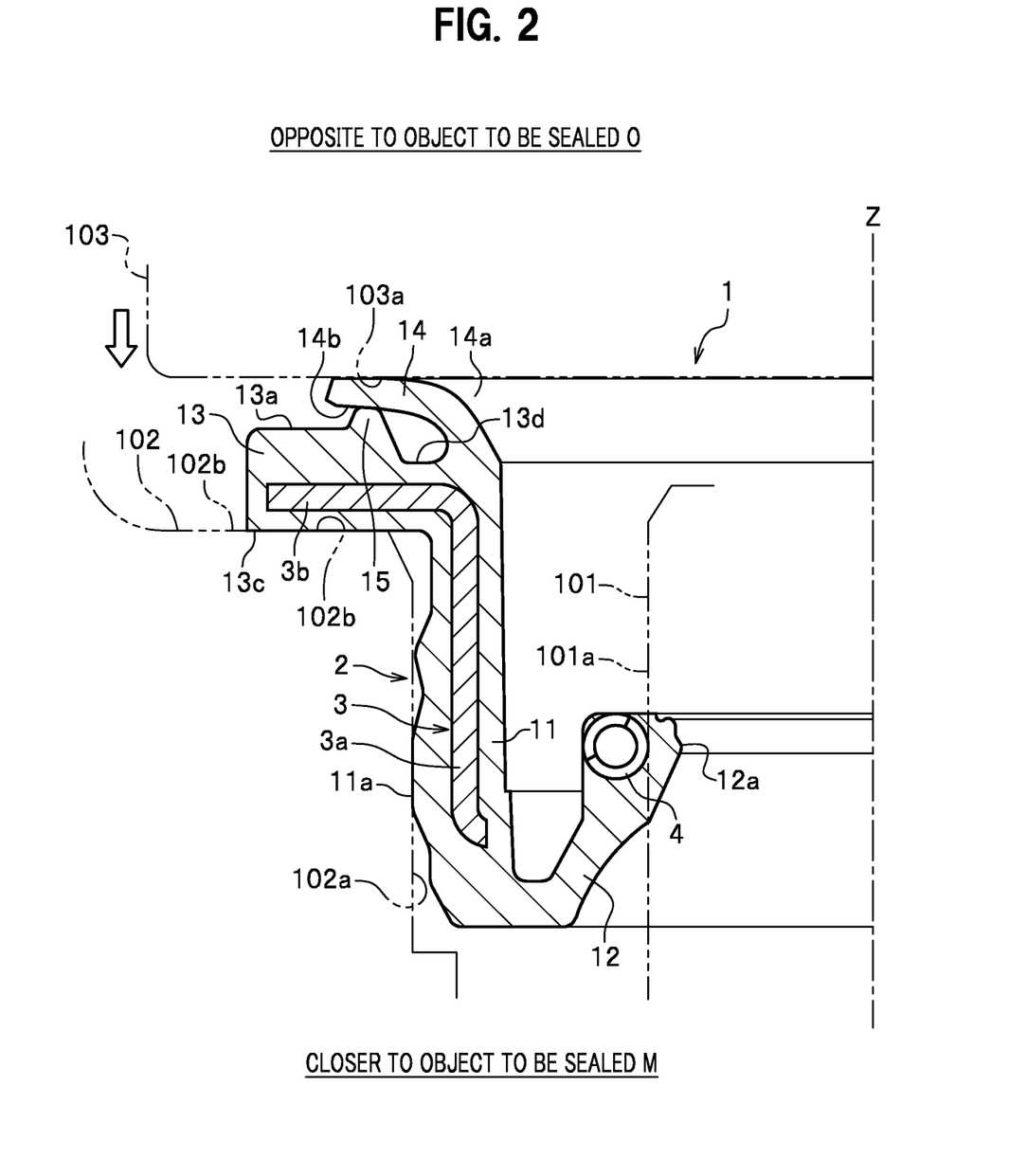
FIG. 2 is a partial cross-sectional view showing the sealing device according to Embodiment 1 in a state where the sealing device is fitted, which is taken along the plane passing through the axial center.
Figure 3:
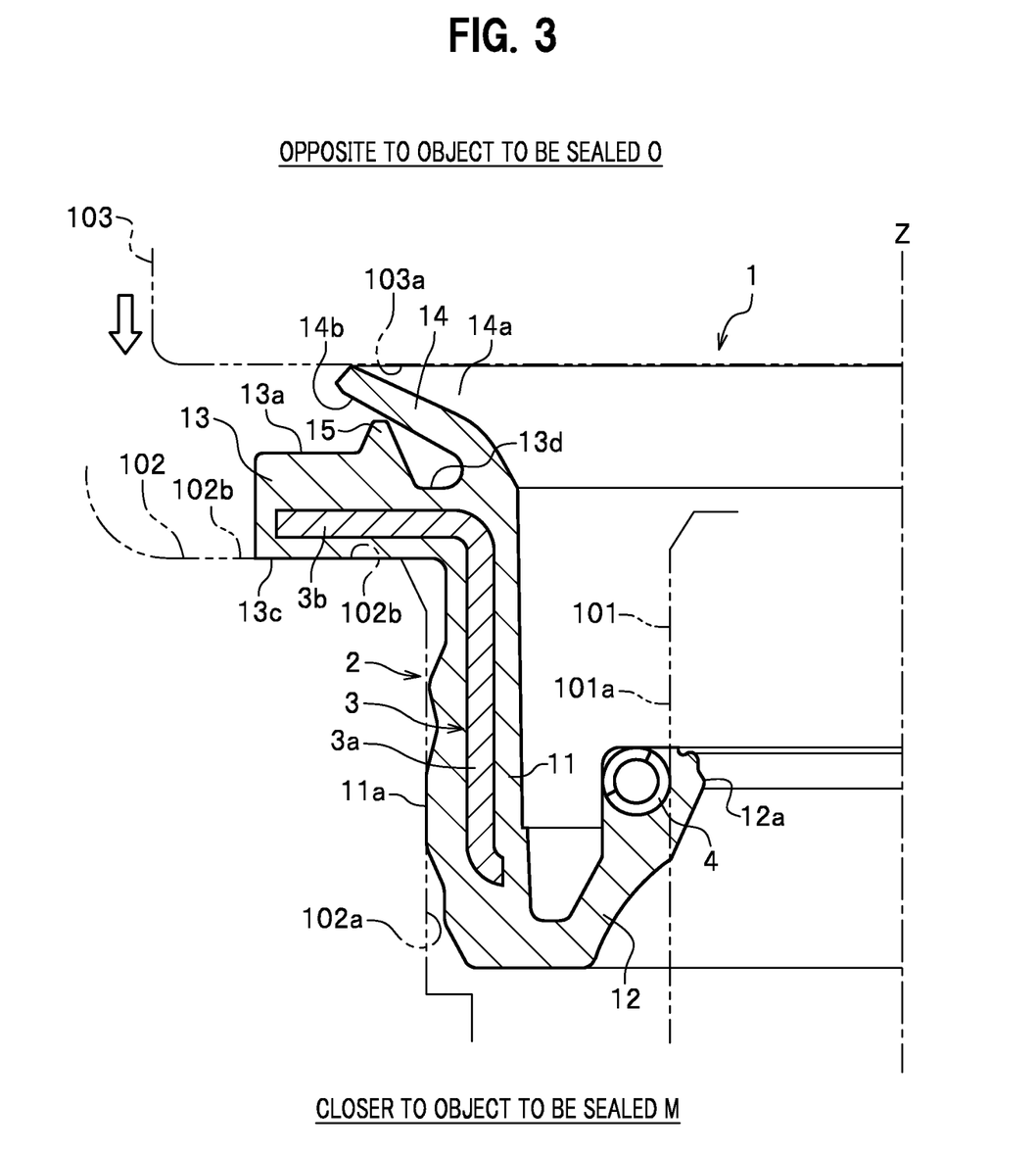
FIG. 3 is another partial cross-sectional view showing the sealing device according to Embodiment 1 in the state where the sealing device is fitted, which is taken along the plane passing through the axial center.

As shown in FIG. 2, the side lip portion 14 is pressed by a counterpart component 103 disposed opposite to an object to be sealed O, whereby a back surface 14b of the side lip portion 14 comes into contact with the projecting portion 15. The number of components can be reduced by providing the elastic body module 2 with the seal lip portion 12 and the side lip portion 14 as described above. Moreover, even in a case where a gap between the counterpart component 103 and the outer member 102 is small due to a positional variation of the counterpart component 103 when the sealing device 1 is fitted, the side lip portion 14 squeezed largely presses the projecting portion 15 provided to the flange portion 13 and thereby largely squeezes the projecting portion 15. Thus, by obtaining a desired surface pressure, the sealing performance can be ensured. On the other hand, also in a case where the projecting portion 15 is not squeezed at all or is squeezed only gently when pressed by the side lip portion 14 squeezed only gently due to a large gap between the counterpart component 103 and the outer member 102 as shown in FIG. 3, the sealing performance can be ensured by obtaining a desired surface pressure. Hereinafter, Embodiments 1 to 4 will be described in details.

Embodiment 1

As shown in FIG. 1, the sealing device 1 according to Embodiment 1 is a device for sealing an annular gap between the columnar shaped inner member 101 (such as a plug tube) that covers the surroundings of a not-illustrated ignition plug attached to an engine head of an engine and the outer member 102 (such as a head cover of the engine) located on radially outside of the inner member 101. Although the present embodiment will describe a case in which the sealing device 1 is used as a plug tube sealing, the sealing device 1 may be used to other applications such as an injector pump sealing. The sealing device 1 is formed mainly from the elastic body module 2, a reinforcing ring 3, and a spring member 4.

The elastic body module 2 includes the main body portion 11, the seal lip portion 12, the flange portion 13, the side lip portion 14, and the projecting portion 15. The elastic body module 2 is integrally formed by using a rubber material of various kinds for example. For example, any of synthetic rubber materials including nitrile butadiene rubber (NBR), hydrogenated nitrile butadiene rubber (H-NBR), acrylic rubber (ACM), fluorine-containing rubber (FKM), and the like is applicable to such a rubber material.

The elastic body module 2 is shaped by cross-linking (vulcanization) molding using a forming mold. In this cross-linking molding process, the reinforcing ring 3 and the spring member 4 located inside the forming mold are brought into cross-linking adhesion to the elastic body module 2. Thus, these components are integrated together.

The main body portion 11 has an annular shape. The main body portion 11 is disposed in a gap between an outer peripheral surface 101a of the inner member 101 and an inner peripheral surface 102a of the outer member 102. An outer peripheral surface 11a of the main body portion 11 is in contact with the inner peripheral surface 102a of the outer member 102.

The seal lip portion 12 is a plate member that extends from an end portion, closer to the object to be sealed M, of the main body portion 11 obliquely upward to the inner member 101 side (opposite to the object to be sealed O). A lip part 12a of the seal lip portion 12 is in contact with the outer peripheral surface 101a of the inner member 101 entirely across a circumferential direction thereof. This configuration seals a sealing target fluid.

The flange portion 13 is a plate member that protrudes radially outward from an end portion, opposite to the object to be sealed O, of the main body portion 11. The flange portion 13 is formed entirely along the main body portion 11 across the circumferential direction. A back surface (a surface closer to the object to be sealed) 13c of the flange portion 13 is in contact with an end surface 102b of the outer member 102.

The side lip portion 14 is a plate member that extends from the end portion, opposite to the object to be sealed O, of the main body portion 11, opposite to the object to be sealed O (in a direction to move away from the object to be sealed M). The side lip portion 14 is provided entirely across the circumferential direction of the main body portion 11 with a plate thickness being gradually reduced toward its tip end. Before the fitting, the side lip portion 14 is inclined in such a shape that its diameter increases toward opposite to the object to be sealed O as shown in FIG. 1. When pressed by the counterpart component 103 shown in FIG. 2, the side lip portion 14 forms a sealing region to prevent ingress of water, muddy water, and the like in conjunction with the projecting portion 15. The counterpart component 103 is an upper part of a coil body of the ignition system, for example.

The projecting portion 15 is a projection formed entirely across the circumferential direction on a front surface (a surface opposite to the object to be sealed) 13a of the flange portion 13. Although a cross-sectional shape of the projecting portion 15 is not limited to a particular shape, the projecting portion 15 is tapered toward its tip end in the present embodiment. Specifically, the projecting portion 15 is inclined downward from its tip end to the front surface 13a of the flange portion 13, while the projecting portion 15 on the side opposite to the front surface 13a side of the flange portion 13 is also inclined downward from the tip end of the projecting portion 15 toward the bottom of a groove portion 13d. Thus, the projecting portion 15 is made gradually thicker toward its base end. The bottom of the groove portion 13d is deeper than the front surface 13a of the flange portion 13. The projecting portion 15 is formed at a position on the front surface 13a of the flange portion 13 where the projecting portion 15 can come into contact with the side lip portion 14.

The flange portion 13 is provided with the groove portion 13d between the projecting portion 15 and the side lip portion 14. How much the side lip portion 14 is tilted when pressed by the counterpart component 103 can be adjusted by adjusting the size and the depth of the groove portion 13d.

The reinforcing ring 3 is a reinforcing member that reinforces the main body portion 11 and the flange portion 13. The reinforcing ring 3 is formed from stainless steel or steel plate cold commercial (SPCC), for example. The reinforcing ring 3 includes a side portion 3a located inside the main body portion 11 and an extending portion 3b located inside the flange portion 13, thus having an L-shaped cross-section. The reinforcing ring 3 is manufactured by press work or by forging, for example.

The spring member 4 is disposed at a tip end of the seal lip portion 12 across the circumferential direction thereof. A garter spring can be used as the spring member 4, for example. The spring member 4 applies a strained force at the lip part 12a of the seal lip portion 12 in a direction to reduce the diameter thereof.

Next, a description will be given of the operation and effect of Embodiment 1. FIG. 2 is a partial cross-sectional view showing the sealing device according to Embodiment 1 in a state during the fitting, which is sectioned along the plane passing through the axial center. The seal lip portion 12 comes into contact with the inner member 101 across the circumferential direction by using a biasing force that tilts the seal lip portion 12 toward the inner member 101 and the strained force of the spring member 4. Thus, the sealing target fluid is sealed.

As the sealing device 1 is fitted and a front surface 14a of the side lip portion 14 is pressed by the counterpart component 103, the tip end of the side lip portion 14 is tilted radially outward and the back surface 14b of the side lip portion 14 comes into contact with the projecting portion 15. A sealing region to prevent the ingress of water, muddy water, and the like is formed between the back surface 14b of the side lip portion 14 and the projecting portion 15.

According to Embodiment 1, the provision of the elastic body module 2 with the seal lip portion 12 and the side lip portion 14 makes it possible to achieve both the function to seal a sealing target fluid such as oil and the waterproof function while reducing the number of components at the same time. Also in a case where the gap between the counterpart component 103 and the outer member 102 is small due to a positional variation of the counterpart component 103 when the sealing device 1 is fitted, the side lip portion 14 is squeezed largely and the projecting portion 15 provided to the flange portion 13 is also squeezed largely by the side lip portion 14, so that a desired surface pressure can be obtained and therefore the sealing performance can be ensured.

In addition, as shown in FIG. 3, in a case where the gap between the counterpart component 103 and the outer member 102 is large due to a positional variation of the counterpart component 103, the projecting portion 15 is not squeezed at all or is squeezed only gently. However, the side lip portion 14 and the counterpart component 103 come into contact with each other, so that a desired surface pressure can be obtained and therefore the sealing performance can be ensured.

Here, if the projecting portion were not provided to the flange portion and the flange portion and the side lip portion were brought into contact with each other, the flange portion and the side lip portion would be in surface contact with each other and a high surface pressure would be difficult to obtain. However, according to the present embodiment, the provision of the tapered projecting portion 15 makes it possible to obtain a high surface pressure between the side lip portion 14 and the projecting portion 15. In addition, in either case of a small gap or a large gap formed between the counterpart component 103 and the outer member 102 due to a positional variation of the counterpart component 103 (a variation in a direction of an axial center Z), a desired surface pressure can be obtained. Therefore, the sealing performance between the side lip portion 14 and the projecting portion 15 can be ensured.

Embodiment 2

Figure 4:
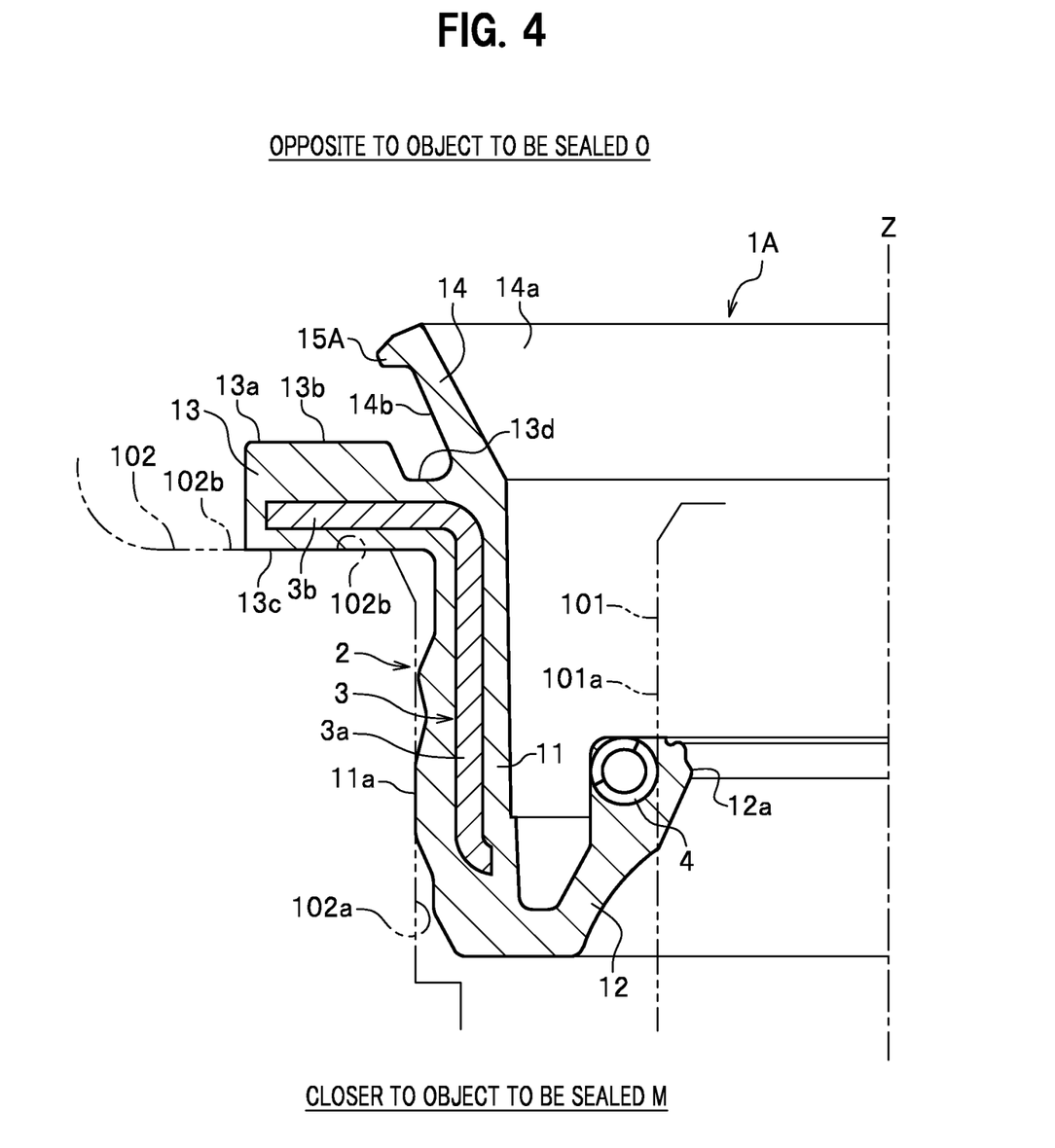
FIG. 4 is a partial cross-sectional view showing a sealing device according to Embodiment 2 in a state before fitting, which is taken along a plane passing through an axial center.

Next, a sealing device 1A according to Embodiment 2 will be described. Embodiment 2 is different from Embodiment 1 in that a side lip portion 14 is provided with a projecting portion 15A. Embodiment 2 will be described chiefly for portions different from those in Embodiment 1.

As shown in FIG. 4, a tip end side of a back surface 14b of the side lip portion 14 (the surface of the side lip portion 14 on a flange portion 13 side) is provided with the projecting portion 15A. The projecting portion 15A is inclined upwardly from its tip end toward the tip end of the side lip portion 14, and the projecting portion 15A on the opposite side, which is the side closer to the base end of the side lip portion 14, is also inclined upwardly from its tip end toward the back surface 14b of the side lip portion 14. Thus, the projecting portion 15A is made gradually thicker toward its base end. The projecting portion 15A is formed entirely across a circumferential direction. A cross-sectional shape of the projecting portion 15A is tapered toward its tip end. A front surface 13b of the flange portion 13 (the surface opposite to the object to be sealed) is flat.

Figure 5:
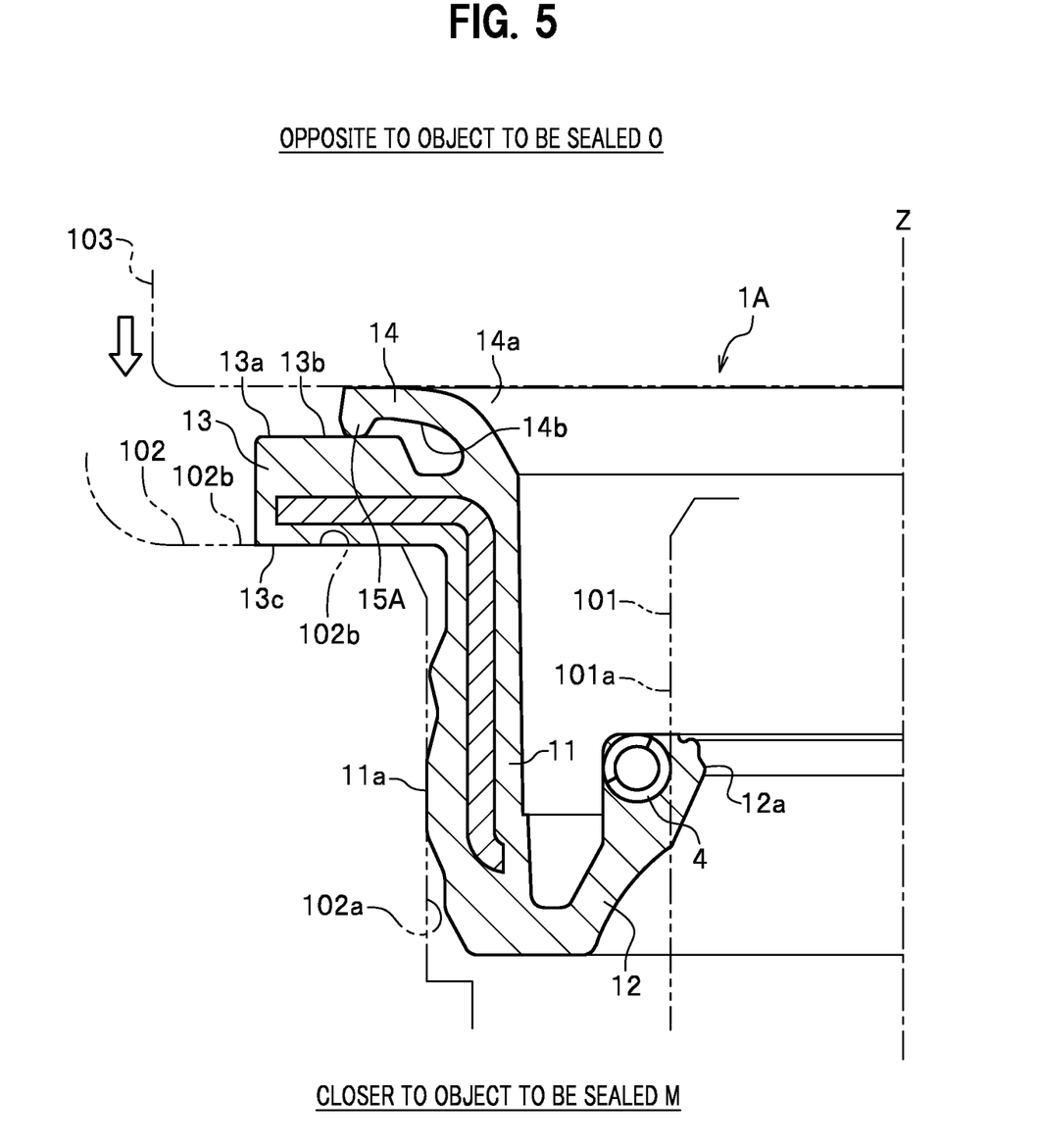
FIG. 5 is a partial cross-sectional view showing the sealing device according to Embodiment 2 in a state where the sealing device is fitted, which is taken along the plane passing through the axial center.

As shown in FIG. 5, in a case where, when the sealing device 1A is fitted, the gap between the counterpart component 103 and the outer member 102 is small and the squeeze is large due to a positional variation of the counterpart component 103, a front surface 14a of the side lip portion 14 is pressed by the counterpart component 103, so that the tip end of the side lip portion 14 is tilted radially outward, the projecting portion 15A of the side lip portion 14 comes into contact with the front surface 13b of the flange portion 13, and the projecting portion 15A is largely squeezed. Thus, a sealing region to prevent the ingress of water, muddy water, and the like is formed between the projecting portion 15A of the side lip portion 14 and the front surface 13b of the flange portion 13. In addition, as in Embodiment 1, in a case where the gap between the counterpart component 103 and the outer member 102 is large due to a positional variation of the counterpart component 103, the projecting portion 15 is not squeezed at all or is squeezed only gently, but the side lip portion 14 and the counterpart component 103 come into contact with each other, so that a desired surface pressure can be obtained and therefore the sealing performance can be ensured.

According to Embodiment 2, the provision of the elastic body module 2 with the seal lip portion 12 and the side lip portion 14 makes it possible to achieve both the function to seal the sealing target fluid such as oil and the waterproof function while reducing the number of components at the same time. In addition, when the sealing device 1A is fitted, the sealing performance can be ensured by obtaining a desired surface pressure even in either case of a small gap or a large gap formed between the counterpart component 103 and the outer member 102 due to a positional variation of the counterpart component 103 (a variation in the direction of the axial center Z).

Embodiment 3

Figure 6:
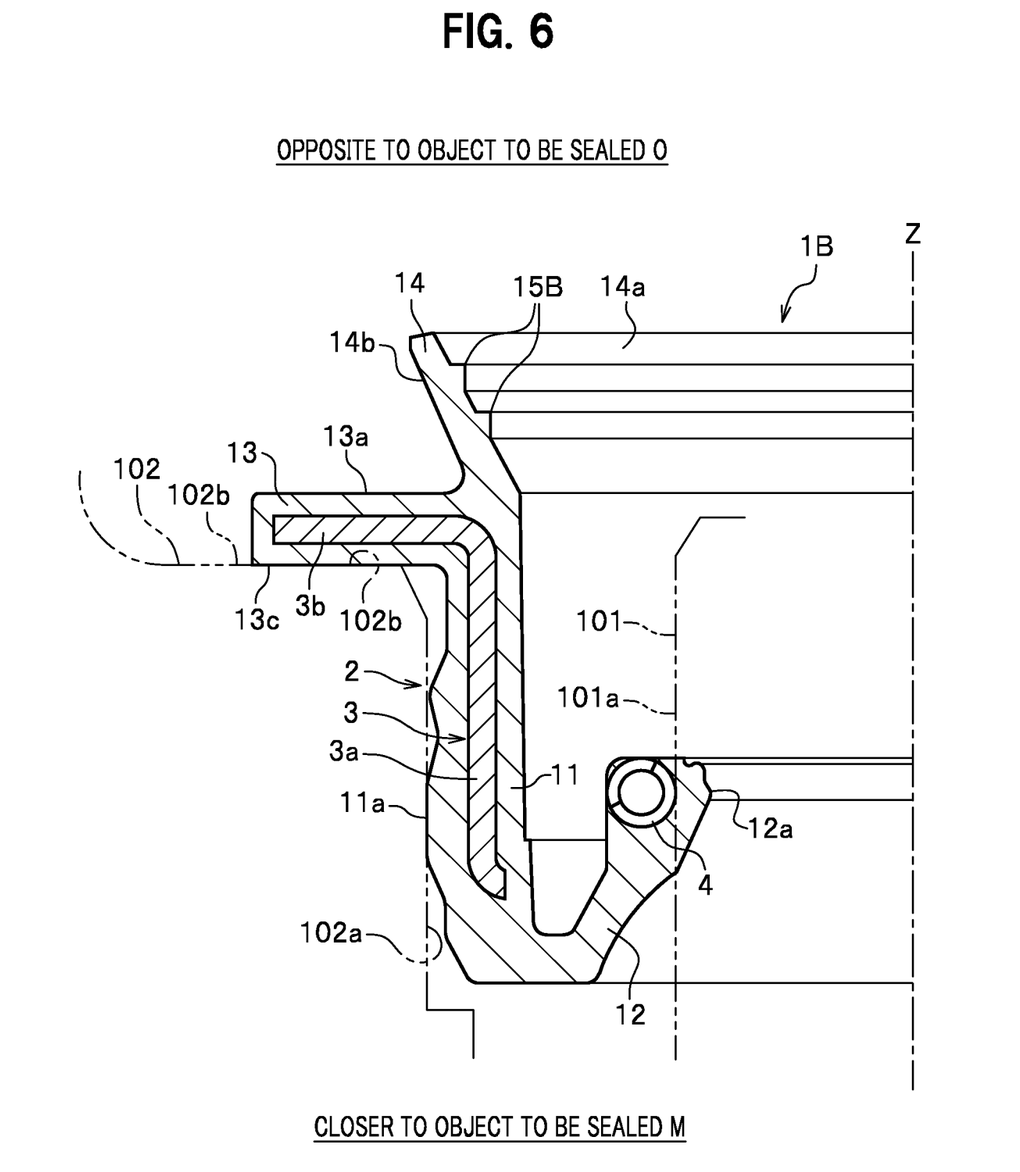
FIG. 6 is a partial cross-sectional view showing a sealing device according to Embodiment 3 in a state before fitting, which is taken along a plane passing through an axial center.

Next, a sealing device 1B according to Embodiment 3 will be described. Embodiment 3 is different from Embodiment 1 in that projecting portions 15B are provided to a front surface 14a of a side lip portion 14 at plural positions in an extending direction of the side lip portion 14. Embodiment 3 will be described chiefly for portions different from those in Embodiment 1.

As shown in FIG. 6, the projecting portions 15B are formed across a circumferential direction on the front surface 14a of the side lip portion 14 (the surface opposite to the object to be sealed) at plural positions in the extending direction of the side lip portion 14. The plural projecting portions 15B are provided at a predetermined interval in between in the extending direction of the side lip portion 14. In the present embodiment, two projecting portions 15B are provided, one of which is on an outer side in the extending direction of the side lip portion 14 and the other of which is on an inner side in the extending direction of the side lip portion 14. Both the projecting portions 15B have tapered shapes. Although the two projecting portions 15B are provided in the present embodiment, three or more projecting portions 15B may be provided.

Figure 7:
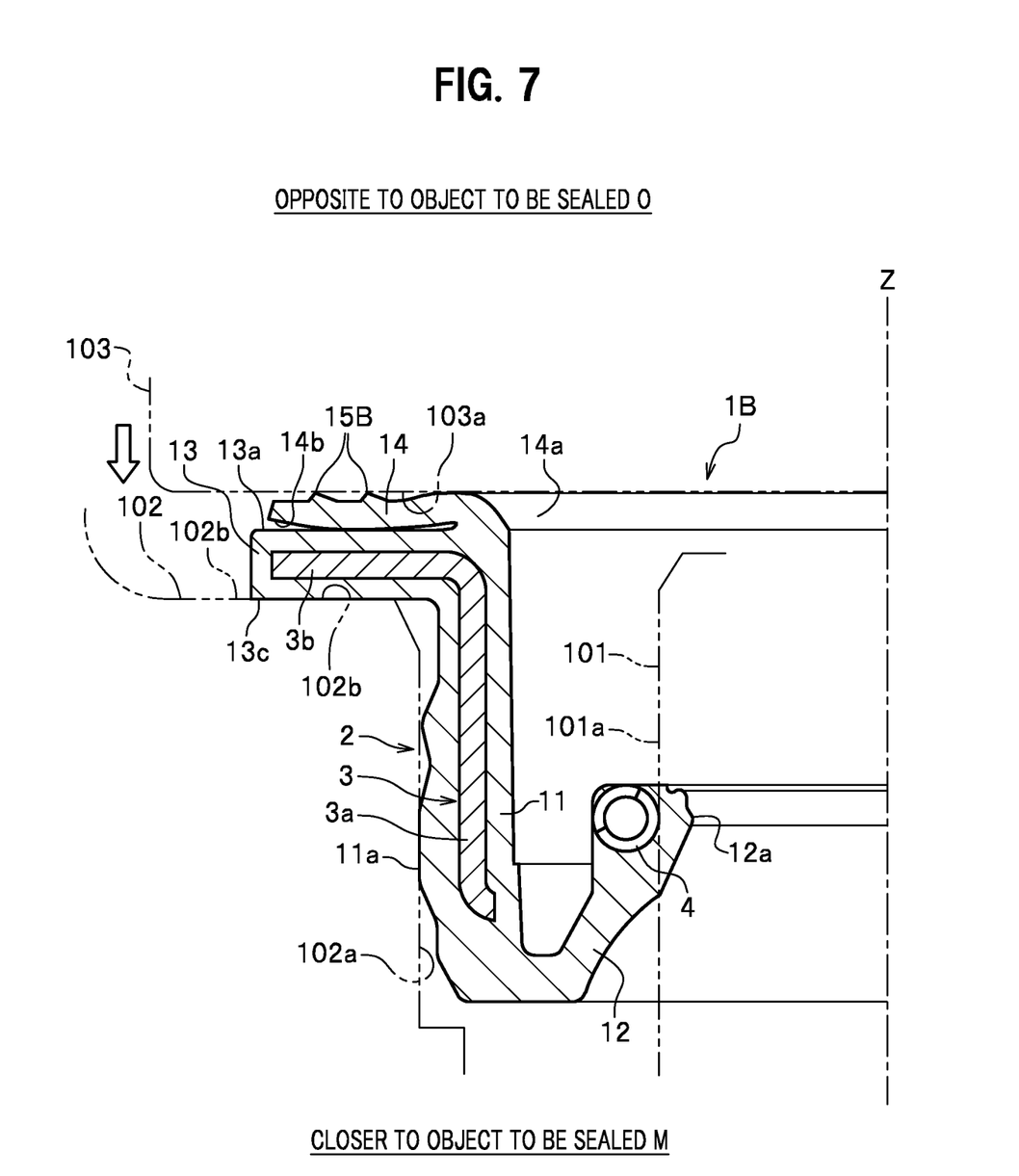
FIG. 7 is a partial cross-sectional view showing the sealing device according to Embodiment 3 in a state where the sealing device is fitted, which is taken along the plane passing through the axial center.

As shown in FIG. 7, in a case where, when the sealing device 1B is fitted, the gap between the counterpart component 103 and the outer member 102 is small and the squeeze is large due to a positional variation of the counterpart component 103, the front surface 14a of the side lip portion 14 is pressed by the counterpart component 103. Thus, the tip end of the side lip portion 14 is tilted radially outward, the back surface 14b of the side lip portion 14 comes into contact with the front surface 13a of the flange portion 13, and the projecting portions 15B and 15B come into contact with the counterpart component 103. Thus, a sealing region to prevent the ingress of water, muddy water, and the like is formed between the back surface 14b of the side lip portion 14 and the front surface 13a of the flange portion 13. In this state, a high surface pressure can be obtained at a position where the projecting portions 15B are provided, because the flange portion 13 and the side lip portion 14 are not in surface contact with each other. In a case where the gap between the counterpart component 103 and the outer member 102 is large due to a positional variation of the counterpart component 103, the side lip portion 14 and the counterpart component 103 come into contact with each other, whereby a desired surface pressure can be obtained and the sealing performance can be ensured.

More specifically, one or both of the projecting portions 15B of the side lip portion 14 and the counterpart component 103 come into contact with each other at one or two positions, a high surface pressure can be obtained at a position where the projecting portions 15B are provided and accordingly the sealing performance can be ensured.

Figure 8:
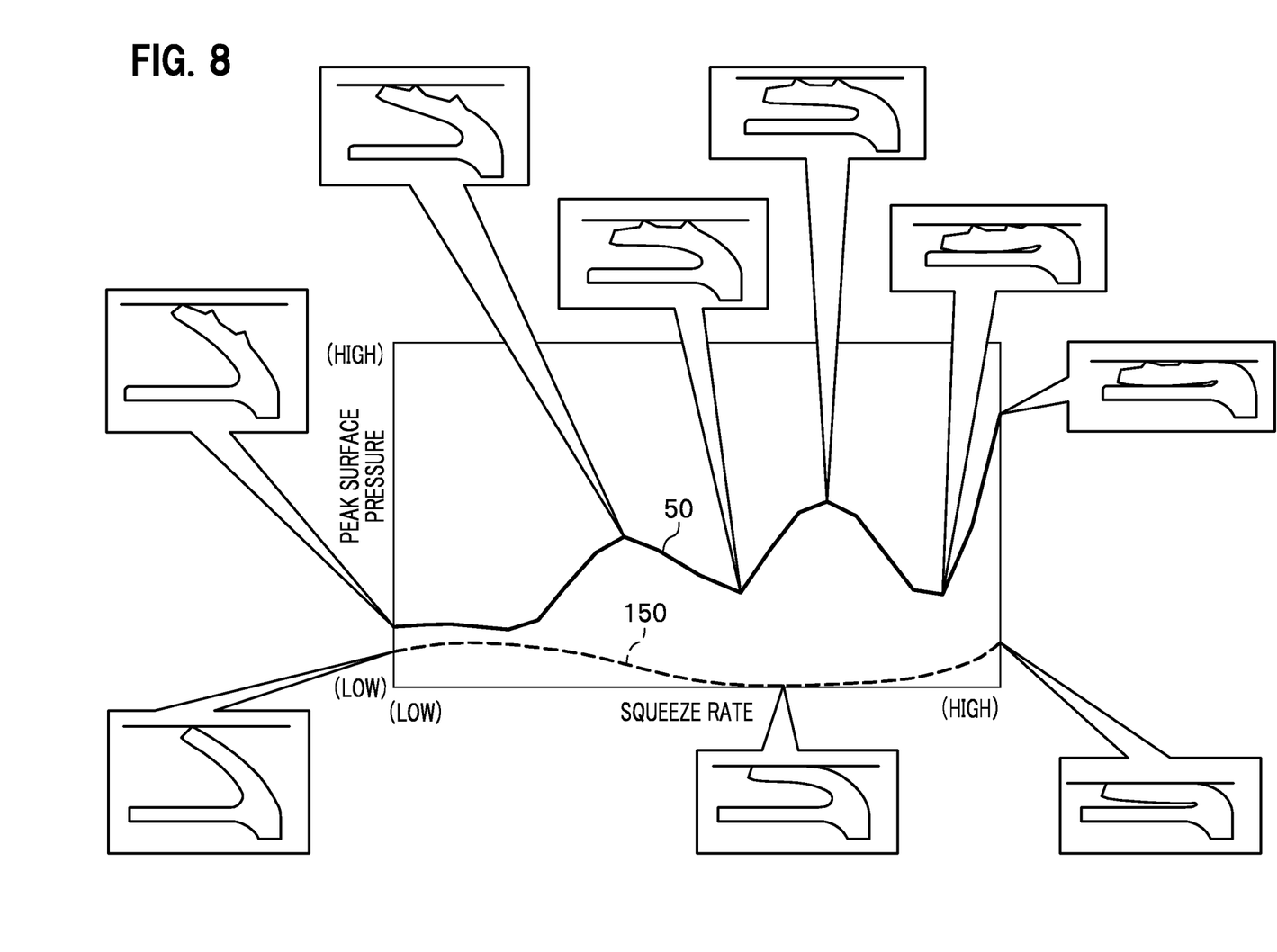
FIG. 8 is a graph in which a horizontal axis is a squeeze rate and a vertical axis is a surface pressure in the sealing device according to Embodiment 3.

FIG. 8 shows a graph in which a horizontal axis is a squeeze rate of the side lip portion 14 and a vertical axis is a maximum value of the surface pressure (peak surface pressure) between the side lip portion 14 and the counterpart component 103 in the sealing device 1B. A graph line 50 indicates values of the sealing device 1B. A graph line 150 indicates values of a comparative example having the same configuration as the sealing device 1 in Embodiment 1 except that the projecting portion 15 is excluded. Each of balloons attached to the graph lines 50 and 150 illustrates how much the side lip portion 14 was squeezed when the corresponding value was measured.

In FIG. 8, the values of the graph line 50 of the sealing device 1B consistently demonstrate a higher peak surface pressure than those of the graph line 150 of the comparative example, regardless of whether the squeeze rate on the horizontal axis is high or low.

According to Embodiment 3, the provision of the elastic body module 2 with the seal lip portion 12 and the side lip portion 14 makes it possible to achieve both the function to seal the sealing target fluid such as oil and the waterproof function while reducing the number of components at the same time. In addition, when the sealing device 1B is fitted, the sealing performance can be ensured by obtaining a desired surface pressure even in either case of a small gap or a large gap formed between the counterpart component 103 and the outer member 102 due to a positional variation of the counterpart component 103 (a variation in the direction of the axial center Z).

Embodiment 4

Figure 9:
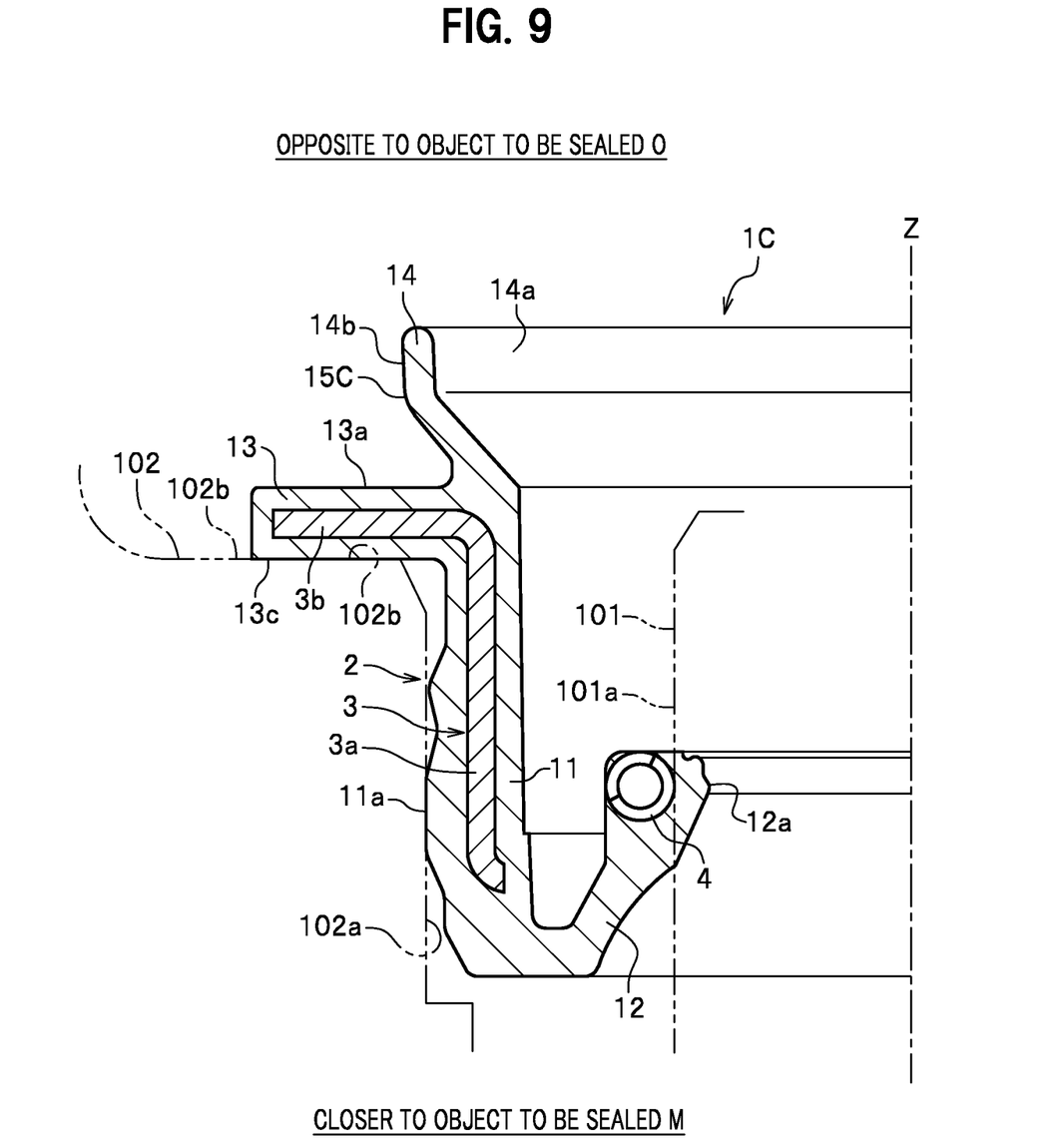
FIG. 9 is a partial cross-sectional view showing a sealing device according to Embodiment 4 in a state before fitting, which is taken along a plane passing through an axial center.

Next, a sealing device 1C according to Embodiment 4 will be described. As shown in FIG. 9, in Embodiment 4, a bending portion 15C is formed in a side lip portion 14, the bending portion 15C bent across a circumferential direction in a shape convex on the back surface 14b side (closer to the object to be sealed). Thus, a tip end of the side lip portion 14 extending from the bending portion 15C stands up toward opposite to the object to be sealed O.

Figure 10:
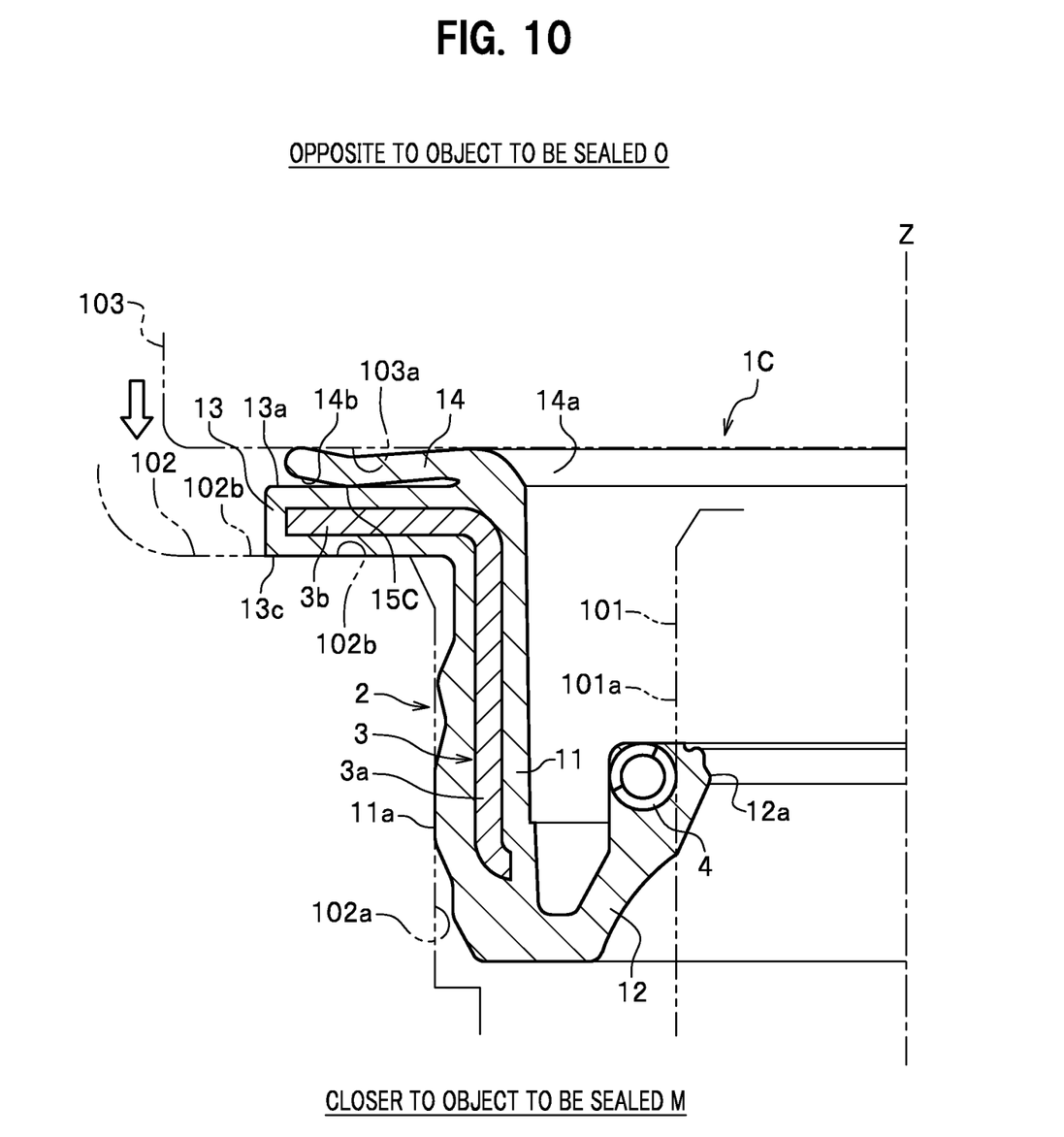
FIG. 10 is a partial cross-sectional view showing the sealing device according to Embodiment 4 in a state where the sealing device is fitted, which is taken along the plane passing through the axial center.

As shown in FIG. 10, in a case where, when the sealing device 1C is fitted, the gap between the counterpart component 103 and the outer member 102 is small and the squeeze is large due to a positional variation of the counterpart component 103, the front surface 14a of the side lip portion 14 is pressed by the counterpart component 103. Thus, the tip end of the side lip portion 14 is tilted radially outward, and the convex shape of the bending portion 15C on the back surface 14b side of the side lip portion 14 comes into contact with the front surface 13a of the flange portion 13, whereby the front surface 14a side of the side lip portion 14 comes into contact with the counterpart component 103. Thus, a sealing region to prevent the ingress of water, muddy water, and the like is formed between the back surface 14b of the side lip portion 14 and the front surface 13a of the flange portion 13. In this state, a high surface pressure can be obtained at a position where the bending portion 15C is provided, because the flange portion 13 and the side lip portion 14 are not in surface contact with each other. In a case where the gap between the counterpart component 103 and the outer member 102 is large due to a positional variation of the counterpart component 103, the tip end of the side lip portion 14 and the counterpart component 103 come into contact with each other, whereby a desired surface pressure can be obtained and the sealing performance can be ensured.

Figure 11:
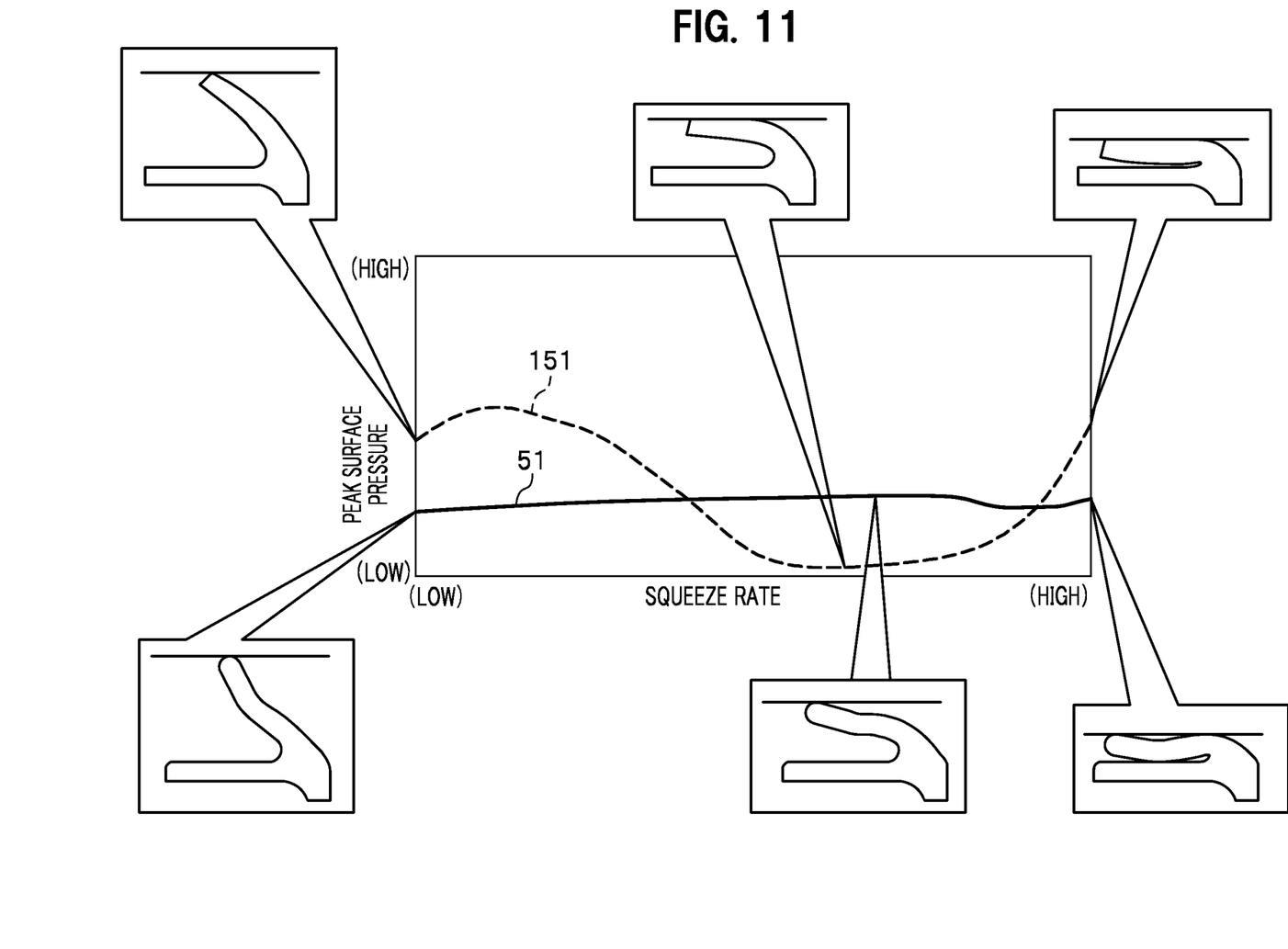
FIG. 11 is a graph in which a horizontal axis is a squeeze rate and a vertical axis is a surface pressure in the sealing device according to Embodiment 4.

FIG. 11 shows a graph in which a horizontal axis is a squeeze rate of the side lip portion 14 and a vertical axis is a maximum value of the surface pressure (peak surface pressure) between the side lip portion 14 and the counterpart component 103 in the sealing device 1C. A graph line 51 indicates values of the sealing device 1C. A graph line 151 indicates values of the comparative example having the same configuration as the sealing device 1 in Embodiment 1 except that the projecting portion 15 is excluded. Each of balloons attached to the graph lines 51 and 151 illustrates how much the side lip portion 14 was squeezed when the corresponding value was measured.

In FIG. 11, the values of the graph line 51 of the sealing device 1C indicate that a substantially constant peak surface pressure can be maintained consistently as compared with the graph line 151 of the comparative example, regardless of whether the squeeze rate on the horizontal axis is high or low. For this reason, the sealing device 1C is prevented from having an excessively low peak surface pressure regardless of whether the squeeze rate is high or low.

According to Embodiment 4, the provision of the elastic body module 2 with the seal lip portion 12 and the side lip portion 14 makes it possible to achieve both the function to seal the sealing target fluid such as oil and the waterproof function while reducing the number of components at the same time. In addition, when the sealing device 1C is fitted, the sealing performance can be ensured by obtaining a desired surface pressure even in either case of a small gap or a large gap formed between the counterpart component 103 and the outer member 102 due to a positional variation of the counterpart component 103 (a variation in the direction of the axial center Z).

REFERENCE SIGNS LIST 1, 1A, 1B, 1C sealing device
2 elastic body module
11 main body portion
12 seal lip portion
13 flange portion
14 side lip portion
14a front surface
14b back surface
15, 15A, 15B projecting portion
15C bending portion
101 inner member (plug tube)
102 outer member (head cover)
103 counterpart component

The invention claimed is:
1. A sealing device configured to seal an object and comprising an elastic body, the elastic body configured to seal an annular gap between an inner member and an outer member, wherein the elastic body comprises:
an annular main body portion to be disposed in the annular gap;
a seal lip portion extending from a portion, configured to be closer to the object to be sealed, of the main body portion and being contactable with the inner member;
a flange portion extending radially outwardly from an axial end, configured to be opposite to the object to be sealed, of the main body portion and including a first side configured to be closer to the object to be sealed, the first side being contactable with an axial end surface of the outer member;

a side lip portion extending from the end configured to be opposite to the object to be sealed in a direction away from the object to be sealed; and a projecting portion formed circumferentially on a second side, configured to be opposite to the object to be sealed, of the flange portion, wherein the side lip portion has a back surface configured to be in contact with the projecting portion in response to the side lip portion being pressed by a mating member configured to be disposed opposite to the object to be sealed, wherein the elastic body has an axial direction, wherein the first side is a first orthogonal surface and the second side is a second orthogonal surface and both the first orthogonal surface and the second orthogonal surface are orthogonal to the axial direction, and wherein the projecting portion is rib shaped.

2. The sealing device according claim 1, wherein the projecting portion has a tapered cross-section.

3. The sealing device according to claim 1, wherein the second side is opposite the first side.

4. The sealing device according to claim 1, wherein the projecting portion has a base end and a tip end, and the projecting portion is inclined downward from the tip end to the base end formed at a surface of the second side of the flange portion.

5. The sealing device according to claim 1, wherein the first side of the flange portion and an outer surface of the annular main body portion are both configured to be in simultaneous contact with the outer member.

6. The sealing device according to claim 1, wherein the side lip portion is positioned radially outward beyond the annular gap.

7. The sealing device according to claim 1, wherein the side lip portion is configured to bend radially outward and further radially away from the annular gap when the side lip portion is pressed by the mating member.

8. The sealing device according to claim 1, wherein the first side and the second side are parallel with each other.

9. A sealing device configured to seal an object and comprising an elastic body, the elastic body configured to seal an annular gap between an inner member and an outer member, wherein the elastic body comprises:

an annular main body portion to be disposed in the annular gap;

a seal lip portion extending from a portion, configured to be closer to the object to be sealed, of the main body portion and being contactable with the inner member;

a flange portion extending radially outwardly from an axial end, configured to be opposite to the object to be sealed, of the main body portion and including a first side configured to be closer to the object to be sealed, the first side being contactable with an axial end surface of the outer member;

a side lip portion extending from the end configured to be opposite to the object to be sealed in a direction away from the object to be sealed; and a projecting portion formed circumferentially on a back surface of the side lip portion, wherein the projecting portion is configured to be in contact with the flange portion in response to the side lip portion being pressed by a mating member configured to be disposed opposite to the object to be sealed, wherein the elastic body has an axial direction, wherein the first side is an orthogonal surface that is orthogonal to the axial direction, and wherein the projecting portion is rib shaped.

10. The sealing device according to claim 9, wherein the projecting portion has a tapered cross-section.

11. The sealing device according to claim 9, wherein the projecting portion has a base end and a tip end, and the projecting portion is inclined downward from the tip end to the base end formed at the back surface of the side lip portion.

12. The sealing device according to claim 9, wherein the first side of the flange portion and an outer surface of the annular main body portion are both configured to be in simultaneous contact with the outer member.

13. A sealing device configured to seal an object and comprising an elastic body, the elastic body configured to seal an annular gap between an inner member and an outer member, wherein the elastic body comprises:

an annular main body portion to be disposed in the annular gap;

a seal lip portion extending from a portion, configured to be closer to the object to be sealed, of the main body portion and being contactable with the inner member;

a flange portion extending radially outwardly from an axial end, configured to be opposite to the object to be sealed, of the main body portion and including a first side configured to be closer to the object to be sealed, the first side being contactable with an axial end surface of the outer member;

a side lip portion extending from the end configured to be opposite to the object to be sealed in a direction away from the object to be sealed; and projecting portions each formed circumferentially on a front surface of the side lip portion and respectively positioned at a plurality of locations in an extension direction of the side lip portion, wherein the projecting portions are configured to be in contact with a mating member configured to be disposed opposite to the object to be sealed with respect to the projecting portions and a back surface of the side lip portion is configured to be in contact with a second side, configured to be opposite to the object to be sealed, of the flange portion in response to the side lip portion being pressed by the mating member, wherein the first side is an orthogonal surface that is orthogonal to the axial direction, and wherein the projecting portions are rib shaped.

14. The sealing device according to claim 13, wherein the projecting portions each have a tapered cross-section.

15. The sealing device according to claim 13, wherein the first side of the flange portion and an outer surface of the annular main body portion are both configured to be in simultaneous contact with the outer member.

16. The sealing device according to claim 13, wherein the side lip portion is positioned radially outward beyond the annular gap.

17. A sealing device configured to seal an object and comprising an elastic body, the elastic body configured to seal an annular gap between an inner member and an outer member, wherein the elastic body comprises:

an annular main body portion to be disposed in the annular gap;

a seal lip portion extending from a portion, configured to be closer to the object to be sealed, of the main body portion and being contactable with the inner member;

a flange portion extending radially outwardly from an axial end, configured to be opposite to the object to be sealed, of the main body portion and including a first side configured to be closer to the object to be sealed, the first side being contactable with an axial end surface of the outer member;

a side lip portion extending from the end configured to be opposite to the object to be sealed in a direction away from the object to be sealed; and a bent portion bent circumferentially and having a convex side of a back surface of the side lip portion, wherein the bent portion is configured to be in contact with the flange portion in response to the side lip portion being pressed by a mating member configured to be disposed opposite to the object to be sealed, wherein the elastic body has an axial direction, and wherein the first side is an orthogonal surface that is orthogonal to the axial direction.

18. The sealing device according to claim 17, wherein the bent portion is configured to be in contact with a second side of the flange portion opposite the first side of the flange portion.

19. The sealing device according to claim 17, wherein the first side of the flange portion and an outer surface of the annular main body portion are both configured to be in simultaneous contact with the outer member.

* * * * *